Nov. 6, 1962 P. T. JOHNSON 3,061,954
CONTROL MECHANISM FOR SCRAPER BOWL AND APRON
Filed April 7, 1961 2 Sheets-Sheet 2

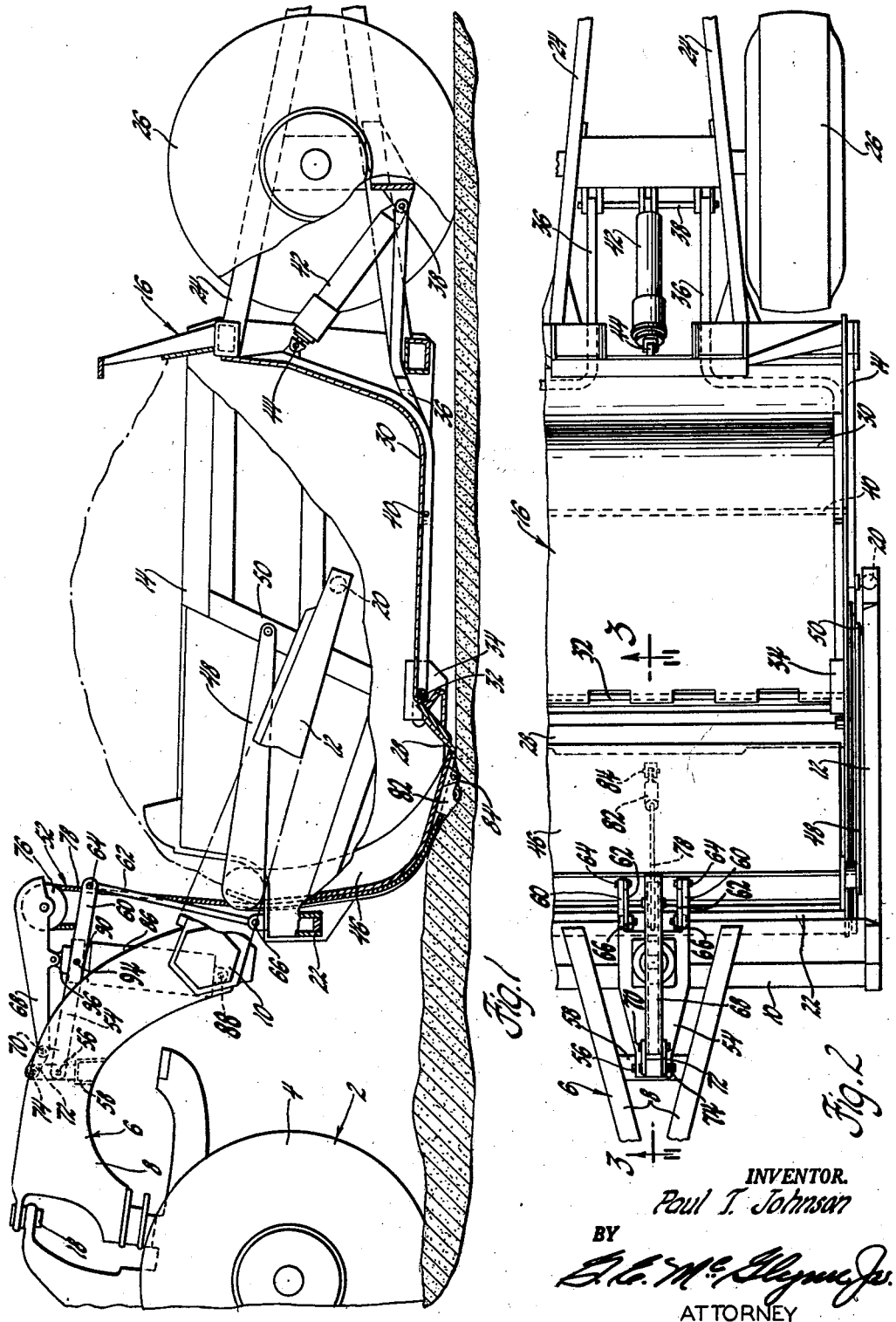

INVENTOR.
Paul T. Johnson
BY
E. E. McGlynn Jr.
ATTORNEY

United States Patent Office 3,061,954
Patented Nov. 6, 1962

1

3,061,954
CONTROL MECHANISM FOR SCRAPER
BOWL AND APRON
Paul T. Johnson, Mentor, Ohio, assignor to General Motors Corporation, Detroit, Mich., a corporation of Delaware
Filed Apr. 7, 1961, Ser. No. 101,525
18 Claims. (Cl. 37—129)

This invention pertains to earth-moving scraper vehicles and, in particular, to a mechanism for controlling the raising and lowering of the scraper bowl and the usual apron adapted to open or close the mouth of the bowl.

United States Patent No. 2,773,320 granted on December 11, 1956 to Edward R. Fryer and William J. Adams discloses a scraper vehicle of the general type to which the present invention pertains. Like most vehicles of this type, Fryer et al discloses a scraper comprising a tractor of prime mover connected through a drawbar or pull yoke to a scraper bowl frame which includes a bowl having an open mouth to receive and discharge loads. The bowl frame, and hence the bowl, is pivotally connected to the pull yoke for lifting and lowering movement between various positions including a lowered digging position and a raised carrying position. Furthermore, scrapers of this type are equipped with an apron pivotally connected to the bowl frame and adapted to be moved between a lowered position closing the mouth of the bowl to retain a load therein, a slightly elevated position for digging purposes and a substantially fully raised position to permit discharge of the load from the bowl through the mouth thereof. Although various mechanisms have been suggested to control the relative positioning of the scraper bowl frame and the scraper apron, such mechanisms have involved completely separate or individual mechanisms for the apron and bowl, or interrelated mechanisms of a complex nature which do not provide independent control of the bowl and apron.

One type of apron and bowl control mechanism utilizing separate power devices for controlling these respective members is disclosed in the Fryer et al. patent. As will be noted from the Fryer et al. patent, a pair of bowl control levers and a single apron control lever are each pivotally connected on a common horizontal transverse axis to the pull yoke of the vehicle. The other ends of each of the bowl control levers are connected to the bowl frame by lift rods, while a cable mechanism has one end rigidly secured to the pull yoke, is entrained about a pulley at the other end of the bowl control lever and has its other end connected to the apron. There independently and selectively operable single stage jacks are each operatively pivotally connected between the pull yoke and a respective one of the three levers aforementioned. The bowl control jacks are extended or retracted in substantial unison to pivot the bowl control levers and hence raise or lower the scraper bowl frame. Similarly, the single apron control jack is adapted to be operated to pivot the apron control lever and hence lift or lower the scraper apron.

It is a principal object and feature of this invention to provide an apron and bowl control mechanism for a scraper vehicle in which a single power device controls positioning of both a scraper bowl and its apron, and operates to move the bowl and apron either in substantial unison or independently of each other.

It is yet another object and feature of this invention to provide a lever-type apron and bowl control mechanism in which respective apron and bowl control levers are controlled by a single power device such as a multi-stage fluid pressure operated jack.

In general, these and other objects of the invention are attained in a control mechanism comprising an apron control lever having one end operatively pivotally connected to the scraper pull yoke and the other end operatively connected to the apron to control the position of the latter, a bowl control lever similarly pivotally connected to the pull yoke and to the bowl to control the position of the latter, and a single multi-stage fluid pressure actuated jack including an exterior cylinder element pivotally connected to the pull yoke, a first stage piston reciprocably disposed in the cylinder element and pivotally connected to the bowl control lever, and a second stage piston reciprocably disposed relative to the first stage piston and pivotally connected to the apron control lever. A conventional hydraulic control system is provided for operation by the vehicle operator to selectively supply and exhaust fluid from each of the two stages of the jack, or to hold fluid pressure therein. Consequently, operation of the first stage of the jack while maintaining the second stage stationary causes pivotal movement of both levers and consequently both the bowl frame and the apron move in substantial unison. Conversely, operation of the second stage while maintaining the first stage stationary causes pivotal movement of the apron control lever independently of the bowl control lever and hence causes pivotal movement of the apron independently of the bowl.

These and other objects, features and advantages of the invention and the manner in which they are attained will become more apparent hereinafter as the description of the invention proceeds, and in which reference is made to the drawings in which:

FIGURE 1 is a fragmentary side elevation, partly broken away, of a scraper vehicle equipped with a preferred embodiment of the invention;

FIGURE 2 is a fragmentary plan view of the scraper of FIGURE 1;

Figure 3:
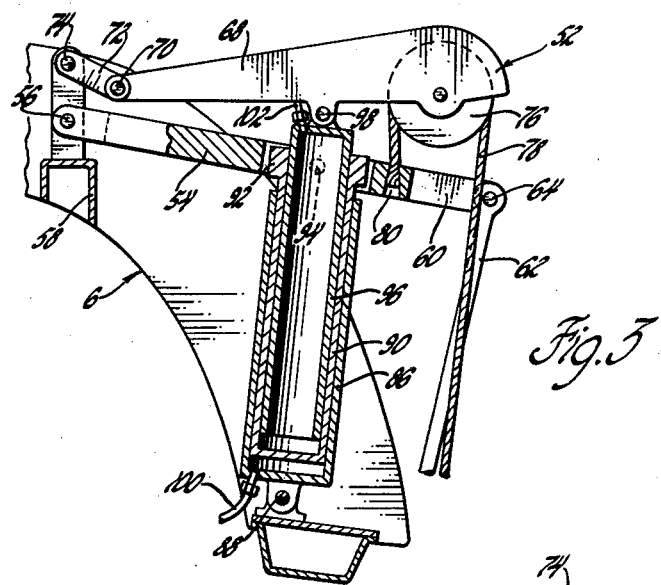
FIGURE 3 is an enlarged view taken on line 3—3 of FIGURE 2 which illustrates one preferred embodiment of the invention.

Referring now to the drawings, the numeral 2 illustrates a prime mover or tractor having a pair of ground engaging wheels 4 mounted thereon and adapted to be driven by power plant (not shown) on the tractor. The drawbar of pull yoke 6 comprises a "gooseneck" including a pair of rearwardly diverging arms 8 terminating in a transversely extending torque tube 10 having rearwardly extending pull arms 12 at either end thereof embracing the side walls 14 of scraper bowl frame 16. The forward end of the "gooseneck" is adapted to be hitched as at 18 to the tractor 2, while the rearward ends of each of the pull arms 12 are suitably pivotally mounted at 20 to the side walls of the scraper bowl frame 16. As a consequence, the bowl frame 18 is pivotally mounted relative to the drawbar 6 and tractor 2 for lifting and lowering movement relative to the ground.

The scraper bowl frame 16 comprises a rigid transversely extending box beam 22 at the forward end thereof, the transversely spaced longitudinally extending bowl side walls 14 aforementioned, and a rearward extension 24 of the frame mounting a pair of ground engaging wheels 26 supporting the bowl frame. A cutting edge 28 extends transversely between lower portions of the bowl side walls 14, and an ejector 30 of arcuate configuration extends transversely of the frame between the side walls and to the rear of cutting edge 28. As is usual in this art, the ejector and bowl side walls form a bowl to receive and carry a load received through the bowl mouth defined by side walls 14 and cutting edge 28, while the ejector is movably mounted on the bowl frame to eject such a load through the bowl mouth.

The ejector and the mechanism for controlling it do not, per se, form a part of this invention and may be of any suitable type well known in the art. Briefly, then, the leading edge of the ejector 30 is pivotally mounted at 32 to a cutting edge support 34 suitably mounted on the bowl frame for reciprocation longitudinally of the latter. A pair of guide links 36 have their opposite ends respectively pivotally connected on horizontal axes indicated at 38 and 40 to bowl frame extension 24 and ejector 30 intermediate the ends of the latter. A fluid pressure operated ejector jack 42 has its opposite ends respectively pivotally connected to the bowl frame on axis 38 and to the ejector at 44. In dumping a load from the bowl, the ejector jack 42 is extended pivoting the ejector upwardly and forwardly toward the bowl mouth. In so pivoting, the guide links 36 pivot upwardly about axis 38 and pull the cutting edge support 34 toward the rear of the bowl. This action dumps the load. For a more complete description of a bowl and ejector construction of this type, reference may be made to the copending United States application Serial No. 841,269 entitled "Scraper Bowl," and filed September 21, 1959 in the name of Janis Mazzarrins.

With the ejector disposed in the position shown in FIGURES 1 and 2, the transversely extending cutting edge 28 and the transversely spaced bowl side walls 14 form a bowl mouth as aforedescribed adapted to be opened or closed by an arcuately curved apron 46 rigidly secured to a pair of transversely spaced support arms 48 having their rearward portions suitably pivotally connected at 50 to the walls 14 on a horizontal transverse axis. Consequently, the apron may be lifted or lowered relative to the bowl mouth to open or close the latter as will be apparent to those skilled in the art.

Referring particularly to FIGURES 1 through 3, a preferred embodiment of the apron and bowl control mechanism 52 comprises a bowl control lever 54 having one end thereof pivotally connected at 56 to a suitable support 58 carried by the drawbar 6, while the other end thereof is bifurcated to form two transversely spaced arms 60. The upper end of a rigid lift rod 62 is pivotally connected at 64 to each of the arms 60, and extends downwardly therefrom for pivotal connection at 66 to the front transversely extending box beam 22 of the scraper bowl frame 16. An apron control lever 68 has one end thereof pivotally connected at 70 to one end of a toggle link 72 having its other end pivotally connected at 74 to the support 58 at a point spaced slightly vertically above the pivotal connection 56 of the bowl control lever to this support. A pulley 76 is rotatably supported at the other end of the apron control lever 68, while one end of a suitable rope or wire cable 78 is secured to the bowl control lever at 80, extends about the pulley 76 and has its other end retained in a bracket 82 pivotally connected at 84 to the apron 46 adjacent the lip of the latter.

A single, single-acting, multi-stage fluid pressure operated jack comprises an outer cylinder element 86 having its base pivotally connected at 88 to a portion of the drawbar 6. A hollow first stage piston element 90 is reciprocably disposed within the cylinder element 86 and includes an annular collar 92 at the outer end thereof which extends into a suitable opening in the bowl control lever 54 intermediate the ends of the latter. A pair of oppositely projecting pivot pins 94 are suitable rotatably mounted on the bowl control lever within the opening therein. A second stage hollow piston 96 is reciprocably disposed within the first stage piston 90, and the base thereof extends out of the second stage piston for pivotal connection at 98 to the apron control lever 68 intermediate the ends of the latter.

The first stage of the jack comprising cylinder element 86 and the first stage piston 90 is adapted to be extended or contracted or retained in any selected relative position by hydraulic pressure supplied to or exhausted from this stage by a conduit 100 connected to a suitable hydraulic system of a well known type (not shown) including a master valve means actuated by the operator of the scraper. In similar fashion, the second stage of the jack comprising the first stage piston 90 and second stage piston 96 is connected to the aforementioned conventional fluid system through the conduit 102. As will be readily apparent, such a conventional fluid system includes the conventional master valve means aforementioned having a neutral position in which no flow occurs through conduits 100 and 102 and any fluid contained in any one of the stages of the jack is retained therein, and other positions permitting the supply of fluid pressure to or exhaust of fluid pressure from the stages to extend or retract these stages, respectively, retraction being accomplished by gravity due to the weight of the bowl or apron and the exhaust of fluid from the stage in question.

Referring now to the operation of this construction, it may be assumed that a digging operation has been completed thereby loading the bowl, and that the apron has been closed over the mouth of the bowl to retain the load therein. At this time, the vehicle and its various parts will be disposed as shown in FIGURES 1 through 3. In order to lift the bowl from its digging position to a carrying position to transport the load to a dumping site, the master valve means of the fluid system is suitably actuated to supply fluid under pressure through the conduit 100 to the first stage of the jack, while no flow at all occurs through conduit 102 to the second stage of the jack with the result that the elements 90 and 96 of the second stage are held immovable relative to each other by the incompressible hydraulic fluid contained therein. As fluid is supplied to the first stage of the jack, the first and second stage pistons 90 and 96 reciprocate upwardly within the cylinder element 86. Consequently, both the bowl control lever 54 and the apron control lever 68 are pivoted upwardly about their respective pivotal connections to the pull yoke. In so pivoting, the lift rods 62 lift the bowl about the axis 20 of its connection to the pull arms 12, while the cable 78 is substantially stationary on the pulley 76 and lifts the apron 46 a substantially equal amount. Consequently, the apron remains in its closed position over the mouth of the bowl.

After the bowl has been lifted to the load transporting position, the master valve means is returned to its neutral or hold position in which fluid may not flow in either conduit 100 or 102 thereby locking both stages of the jack in position to hold the bowl and apron in the carrying position.

When the dumping site is reached, the master valve means is actuated to supply fluid under pressure through the conduit 102 to the second stage of the jack, while the first stage of the jack is held in its previously obtained carrying position by preventing any flow through the conduit 100. The second stage piston 96 then reciprocates upwardly within the first stage piston 90 to pivot the apron lever 68 upwardly relative to the bowl control lever 54. Since the bowl control lever remains stationary and one end of the cable 78 is secured thereto, lifting of the apron control lever in this manner causes rotation of the pulley 76 and lifting of the apron 46 to a position fully opening the mouth of the bowl for discharge of the load by the ejector 30.

After the load is ejected, the master valve means is actuated to exhaust fluid from the second jack stage through conduit 102 to a desired extent, such as to either close the bowl or dispose the lip of the apron a slight distance above the cutting edge 28 in preparation for the next digging cycle. In the latter case, when the vehicle returns to the digging site, fluid is exhausted from the first stage of the jack through conduit 100, thereby lowering the cutting edge 28 into digging position. During this lowering movement of the bowl, fluid is retained in the second stage of the jack providing concurrent movement of the apron and bowl so that the cutting edge of the latter and the apron move in unison and are automatically disposed in their respective digging positions.

The geometry of the pivotal connections 56, 94, 98 and 74 is such that the pivotal connection 94 of the first stage piston 90 to the bowl control lever and the pivotal connection 98 of the second stage piston 96 to the apron control lever 68 shift endwise of the lever mechanism relative to each other. More specifically, the effective distance between the pivot axis 74 and the axis 98 on the apron control lever lengthens relative to the corresponding distance between the pivotal connections 56 and 94 on the bowl control lever during lifting movement, and shortens during lowering movement. The toggle link 72 compensates for this change in distances to prevent binding of the mechanism by permitting the apron control lever and more particularly its pivot connection 98 to the second stage piston 96 to shift relative to the pivotal connection 94 of the first stage piston to the bowl control lever 54.

Figure 4:
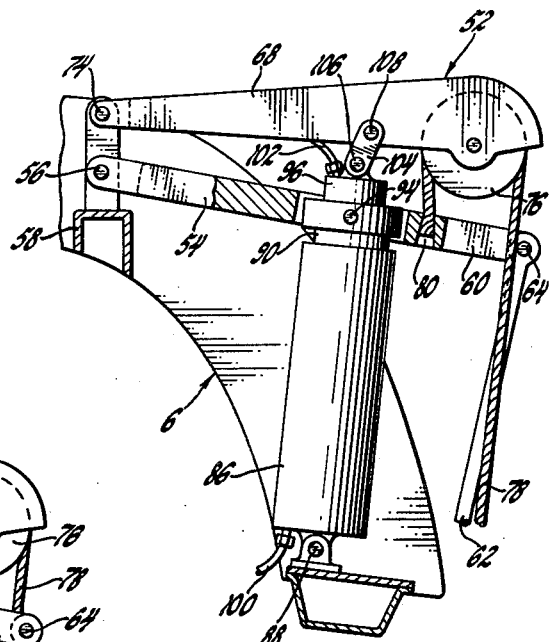
FIGURE 4 is a view corresponding generally to FIGURE 3 but illustrating a second embodiment of the invention.

Referring now to FIGURE 4 and a second embodiment of the invention, like numerals have been employed to indicate parts corresponding to those previously described. The principal difference between this embodiment and that previously described is that the apron control lever 68 is directly pivotally connected at the pivot point 74 to the support 58, and a toggle link 104 corresponding generally to the toggle link 72 previously described is pivotally connected at 106 and 108 respectively to the upper end of the second stage piston 96 and an intermediate portion of the apron control lever 68. The operation of this embodiment of the invention is identical to that previously described, except in this case the toggle link 104 compensates for changes in the effective distance between the pivot points 74 and 108 on the apron control lever relative to the pivotal connections 56 and 94 of the bowl control lever.

Figure 5:
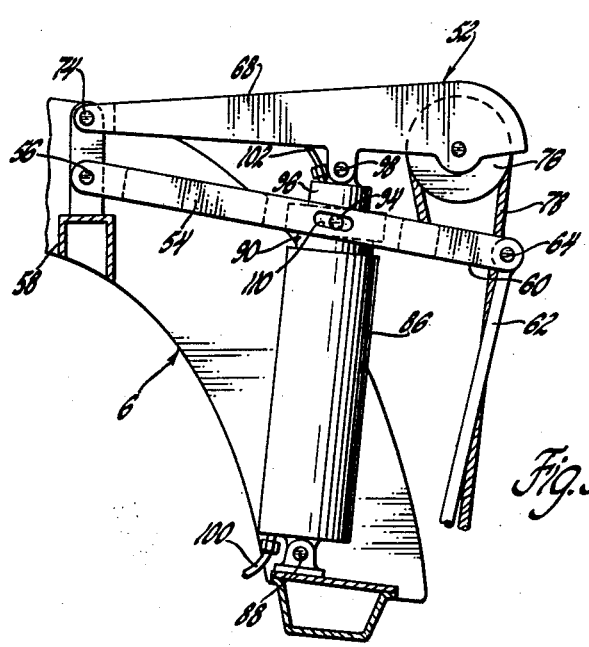
FIGURE 5 is a view corresponding generally to FIGURES 3 and 4 but illustrating yet another embodiment of the invention.

In similar fashion, the third embodiment illustrated in FIGURE 5 differs from those previously described in that the apron control lever has its rearward end directly pivotally connected at 74 to the support as in the FIGURE 4 embodiment, and the second stage piston element 96 is pivotally connected at 98 to the apron control lever as in the FIGURE 3 embodiment. In this embodiment however, the pivot pins 94 on the first stage piston 90 are rotatably and slidably disposed in opposed elongate slots 110 extending endwise of the bowl control lever 54. Again, the purpose of this construction is to compensate for changes in the effective length between the apron lever pivotal connections 74 and 98 relative to the length between the bowl control lever pivotal connection 56 and the axis of the pins 94. Otherwise, the operation of this embodiment of the invention is identical to that previously described.

While but three forms of the invention have been shown and described, other forms will now be apparent to those skilled in the art. Therefore, the embodiments shown in the drawings are merely for illustrative purposes, and are not intended to limit the scope of the invention which is defined by the claims which follow.

I claim:

1. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a multi-stage fluid pressure operated jack pivotally mounted on said first frame member and including two stages, means connecting one of said stages to said second frame member and means connecting the other of said stages to said apron whereby operation of said one stage pivots said second frame member and said apron in substantial unison and operation of said other stage independently pivots said apron relative to said second frame member.

2. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a multi-stage fluid pressure operated jack having first and second independently operable stages, said jack including relatively extensible and retractable piston and cylinder elements, means connecting one of said elements of said jack to said first frame member, means connecting another of said elements to said second frame member, and means connecting a third of said elements to said apron whereby operation of said first stage pivots said second frame member and said apron in substantial unison and operation of said second stage independently pivots said apron relative to said second frame member.

3. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a multi-stage fluid pressure operated jack have first and second independently operable stages, each of said stages including relatively extensible and retractable piston and cylinder elements, the piston element of said first stage being the cylinder element of said second stage, means connecting the cylinder end piston elements of said first stage to said first frame member and said second frame member respectively, and means connecting the piston element of said second stage to said apron whereby operation of said first stage pivots said second frame member and said apron in substantial unison and operation of said second stage independently pivots said apron relative to said second frame member.

4. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a fluid pressure operated jack having first and second stages and including a cylinder element, a first stage piston element reciprocably disposed within said cylinder element, a second stage piston element reciprocably disposed in said first stage piston element, means for selectively supplying and exhausting fluid under pressure from each of said stages of said jack, means connecting said cylinder and said first stage piston element to said first frame member and said second frame member respectively to control the position of said bowl, means connecting said second stage piston element to said apron to control the position of the latter whereby operation of said first stage pivots said bowl and apron in substantial unison and operation of said second stage independently pivots said apron relative to said bowl.

5. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a bowl control lever operatively pivotally connnected to said first frame member and connected to said second frame member to control the position of said bowl, an apron control lever operatively pivotally connected to said first frame member and connected to said apron to control the position of the latter, a multi-stage fluid pressure operated jack having first and second stages, said first and second stages including first and second piston elements respectively, means pivotally mounting said jack on said first frame member, means pivotally connecting said first piston element to said bowl control lever, and means pivotally connecting said second piston element to said apron control lever, whereby operation of said first stage pivots said bowl and apron levers in substantial unison and operation of said second stage pivots said apron control lever relative to said bowl control lever.

6. The invention as defined in claim 5 in which the pivotal connection of said apron control lever to said first frame member comprises a link having spaced points thereon respectively pivotally connected to said apron control lever and to said first frame member.

7. The invention as defined in claim 5 wherein said means pivotally connecting said second piston element to said apron control lever comprises a link having spaced points thereon respectively pivotally connected to said second piston element and to said apron control lever.

8. The invention as defined in claim 5 wherein said means pivotally connecting said first piston element to said bowl control lever comprises pivot pin means rotatably and slidably disposed in elongate slot means extending endwise of said bowl control lever.

9. The invention as defined in claim 5 in which the connection between said apron control lever and said apron to control the position of the latter comprises a pulley rotatably mounted on said apron control lever, and rope means extending about said pulley and having opposite ends thereof connected to said bowl control lever and to said apron.

10. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a fluid pressure operated jack having first and second stages and including a cylinder element, a first stage piston element reciprocably disposed within said cylinder element, a second stage piston element reciprocably disposed in said first stage piston element, means for selectively supplying and exhausting fluid under pressure from each of said stages of said jack, a bowl control lever, means pivotally connecting said bowl control lever to said first frame member, means connecting said bowl control lever to said second frame member to control the position of said bowl, an apron control lever, means pivotally connecting said apron control lever to said first frame member, means connecting said apron control lever to said apron to control the position of the latter, means pivotally connecting said cylinder element to said first frame member, means pivotally connecting said first stage piston element to said bowl control lever, and means pivotally connecting said second stage piston element to said apron control lever whereby operation of said first stage pivots said bowl and apron control levers in substantial unison and operation of said second stage pivots said apron control lever relative to said bowl control lever.

11. The invention as defined in claim 10 in which said means pivotally connecting said apron control lever to said first frame member comprises a link having spaced points thereon respectively pivotally connected to said apron control lever and to said first framemember.

12. The invention as defined in claim 10 wherein said means pivotally connecting said second stage piston element to said apron control lever comprises a link having spaced points thereon respectively pivotally connected to said second stage piston element and to said apron control lever.

13. The invention as defined in claim 10 in which said means pivotally connecting said first stage piston element to said bowl control lever comprises pivot pin means rotatably and slidably disposed in slot means extending endwise of said bowl control lever.

14. The invention as defined in claim 10 in which said means connecting said apron control lever to said apron to control the position of the latter comprises a pulley rotatably mounted on said apron control lever, and a cable extending about said pulley and having opposite ends thereof connected to said bowl control lever and to said apron.

15. A scraper vehicle comprising a first frame member, a second frame member including a scraper bowl having an open end for receiving and discharging a load, means pivotally interconnecting said frame members for movement of said bowl between a lowered digging position and a raised carrying position, an apron, means pivotally connecting said apron to said second frame member for movement between a lowered position closing the open end of said bowl and a raised position opening said end of said bowl, a bowl control lever, means pivotally connecting one end of said bowl control lever to said first frame member, means connecting the other end of said bowl control lever to said second frame member to control the position of said bowl, an apron lever, means pivotally connecting one end of said apron control lever to said first frame member, a pulley rotatably mounted on the other end of said apron control lever, a cable having spaced portions thereof respectively connected to said bowl control lever and said apron and an intermediate portion extending about said pulley to control the position of said apron, a fluid pressure operated jack having first and second stages comprising a cylinder, a first stage piston reciprocably disposed within said cylinder, a second stage piston reciprocably disposed in said first stage piston, means for selectively supplying and exhausting fluid under pressure from each of said stages of said jack independently of the other, means pivotally connecting said cylinder to said first frame member, means pivotally connecting said first stage piston to said bowl control lever intermediate the ends of the latter, and means pivotally connecting said second stage piston to said apron control lever intermediate the ends of the latter, whereby supplying fluid under pressure to said first stage pivots said bowl and apron control lever in substantial unison and supplying fluid under pressure to said second stage pivots said apron control lever relative to said bowl control lever.

16. The invention as defined in claim 15 in which said means pivotally connecting one end of said apron control lever to said first frame member comprises a link having spaced points thereon respectively pivotally connected to said apron control lever and to said first frame member.

17. The invention as defined in claim 15 in which said means pivotally connecting said second stage piston to said apron control lever comprises a link having spaced points thereon respectively pivotally connected to said second stage piston and to said apron control lever intermediate the ends of the latter.

18. The invention as defined in claim 15 in which said means pivotally connecting said first stage piston to said bowl control lever comprises pivot pin means rotatably and slidably disposed in elongate slot means extending endwise of said bowl control lever intermediate the ends of the latter.

References Cited in the file of this patent

UNITED STATES PATENTS

| | | |
|---|---|---|
| 172,650 | Perkins | Jan. 25, 1876 |
| 2,252,763 | French | Aug. 19, 1941 |
| 2,773,320 | Fryer et al. | Dec. 11, 1956 |

FOREIGN PATENTS

| | | |
|---|---|---|
| 507,802 | Italy | Jan. 3, 1955 |